US012096330B2

(12) United States Patent
Sun et al.

(10) Patent No.: US 12,096,330 B2
(45) Date of Patent: Sep. 17, 2024

(54) QUALITY OF SERVICE (QOS) ENHANCEMENT FOR A SIDE-LINK RELAY

(71) Applicant: Apple Inc., Cupertino, CA (US)

(72) Inventors: Haitong Sun, Cupertino, CA (US); Chunxuan Ye, San Diego, CA (US); Zhibin Wu, Los Altos, CA (US); Yuqin Chen, Beijing (CN); Fangli Xu, Beijing (CN); Haijing Hu, Los Gatos, CA (US); Dawei Zhang, Saratoga, CA (US); Wei Zeng, Saratoga, CA (US); Sudeep Manithara Vamanan, Nuremberg (DE)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/441,389

(22) PCT Filed: Mar. 31, 2021

(86) PCT No.: PCT/CN2021/084512
§ 371 (c)(1),
(2) Date: Sep. 21, 2021

(87) PCT Pub. No.: WO2022/205117
PCT Pub. Date: Oct. 6, 2022

(65) Prior Publication Data
US 2024/0049104 A1 Feb. 8, 2024

(51) Int. Cl.
*H04W 40/12* (2009.01)
*H04W 28/24* (2009.01)
*H04W 40/22* (2009.01)

(52) U.S. Cl.
CPC ........... *H04W 40/12* (2013.01); *H04W 28/24* (2013.01); *H04W 40/22* (2013.01)

(58) Field of Classification Search
None
See application file for complete search history.

(56) References Cited

U.S. PATENT DOCUMENTS 10,972,933 B2 * 4/2021 Hampel ............... H04W 76/11
11,240,724 B2 2/2022 Han et al.
(Continued)

FOREIGN PATENT DOCUMENTS

| CN | 107979444 A | 5/2018 |
| CN | 110995773 A | 4/2020 |

(Continued)

OTHER PUBLICATIONS

International Search Report and Written Opinion of the International Searching Authority directed to related International Patent Application No. PCT/CN2021/084512, mailed Jan. 6, 2022; 9 pages.

(Continued)

*Primary Examiner* — Brian S Roberts
(74) *Attorney, Agent, or Firm* — Sterne, Kessler, Goldstein & Fox P.L.L.C

(57) ABSTRACT

An approach is described for a user equipment (UE) comprising a transceiver configured to enable wireless communication with a second UE and a wireless device and a processor communicatively coupled to the transceiver. The processor is configured receive, from the second UE, an end-to-end (E2E) quality of service (QoS) requirement of an E2E connection between the second UE and the wireless device, wherein the E2E connection includes a first hop between the UE and the second UE and a second hop between the UE and the wireless device. The processor is further configured to obtain a first hop link condition and a second hop link condition; split the E2E QoS requirement into a first hop QoS requirement and a second hop QoS requirement based on the first hop link condition and the (Continued)

second hop link condition; and transmit, using the transceiver, the first hop QoS requirement to the second UE. The wireless device is a third UE or a base station.

19 Claims, 10 Drawing Sheets

(56) References Cited

U.S. PATENT DOCUMENTS

| | | | |
|---|---|---|---|
| 11,259,350 B1* | 2/2022 | Pan | H04W 88/04 |
| 2018/0279319 A1* | 9/2018 | Yu | H04W 40/12 |
| 2020/0068580 A1* | 2/2020 | Tang | H04W 76/14 |
| 2020/0107397 A1* | 4/2020 | Lee | H04W 40/18 |
| 2020/0245219 A1* | 7/2020 | Cheng | H04L 47/24 |
| 2020/0374778 A1* | 11/2020 | Arngren | H04W 40/12 |
| 2021/0289391 A1* | 9/2021 | Paladugu | H04L 47/2491 |
| 2022/0095168 A1* | 3/2022 | Kuo | H04W 28/0268 |
| 2022/0240122 A1* | 7/2022 | Liu | H04B 17/309 |
| 2023/0171645 A1* | 6/2023 | Wang | H04W 28/0967 455/11.1 |
| 2023/0388850 A1* | 11/2023 | Pan | H04W 28/0268 |

FOREIGN PATENT DOCUMENTS

| | | |
|---|---|---|
| CN | 112512080 A | 3/2021 |
| EP | 3 332 561 B1 | 10/2020 |
| WO | WO 2018/078438 A1 | 5/2018 |

OTHER PUBLICATIONS

InterDigital Inc.: "Discussion on L2 Relay Architecture and QoS", 3GPP Draft; R2-2009206, 3GPP RAN WG2 Meeting #112-e, Electronic, Nov. 2020; 7 pages.

Intel Corporation: "Characteristics of L2 and L3-based Sidelink Relaying", 3GPP Draft; R2-2006718, 3GPP TSG-RAN WG2 Meeting #111e, Electronic, Aug. 2020; 23 pages.

* cited by examiner

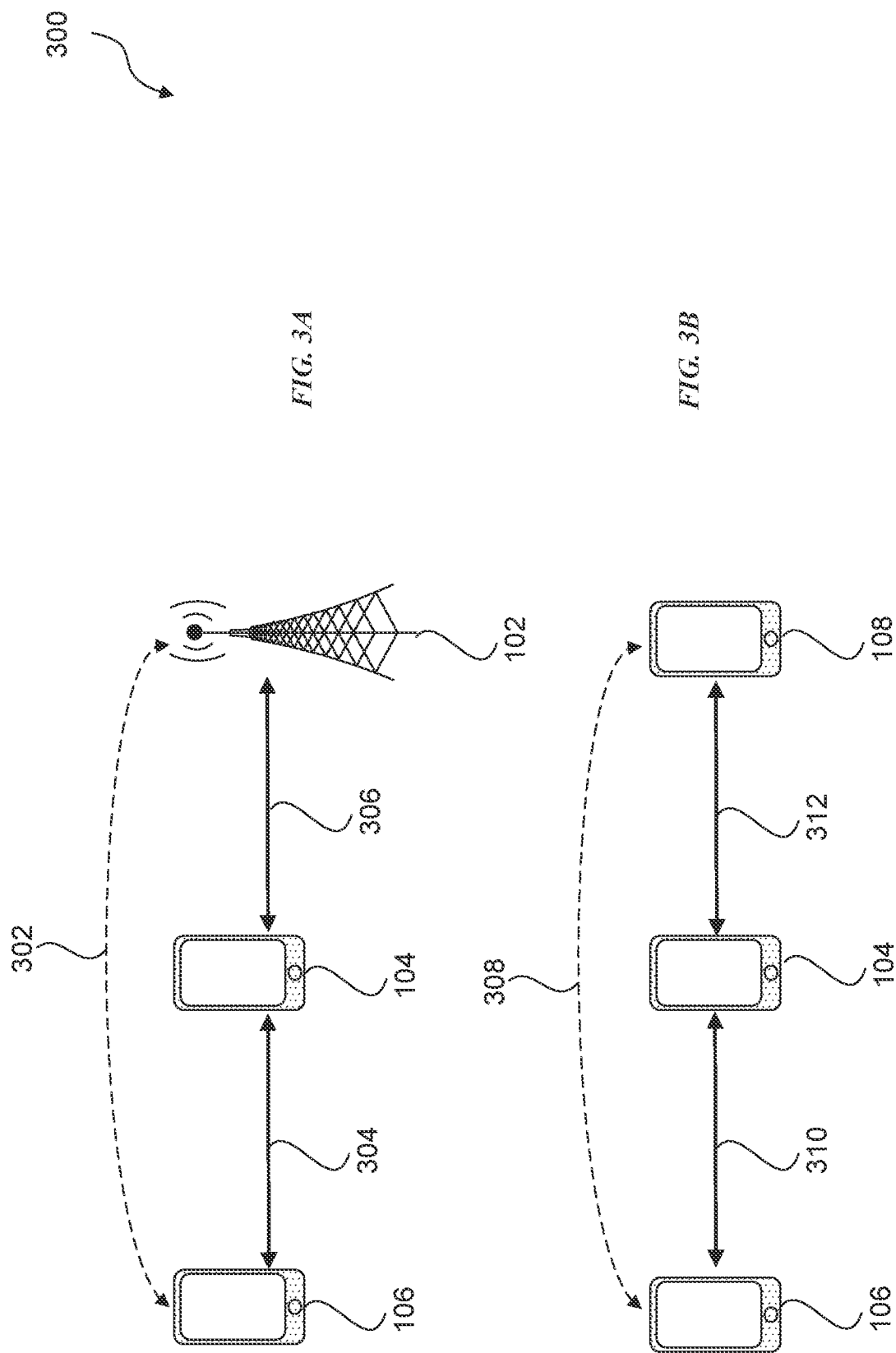

QUALITY OF SERVICE (QOS) ENHANCEMENT FOR A SIDE-LINK RELAY

This application is a U.S. National Phase of International Application No. PCT/CN2021/084512, filed Mar. 31, 2021, which is hereby incorporated by reference in its entirety.

BACKGROUND

Field

The described aspects generally relate to an enhancement on a quality of service (QoS) for side-link relay.

SUMMARY

Some aspects of this disclosure relate to apparatuses and methods for implementing a quality of service (QoS) enhancement for a side-link relay for 3rd Generation Partnership Project (3GPP) release 15 (Rel-15), release 16 (Rel-16), release 17 (Rel-17), and/or other 3GPP releases that support QoS splitting. For example, systems and methods are provided for implementing splitting an end-to-end QoS requirement based on link conditions.

Some aspects of this disclosure relate to a user equipment (UE) comprising a transceiver configured to enable wireless communication with a second UE and a wireless device and a processor communicatively coupled to the transceiver. The processor is configured receive, from the second UE, an end-to-end (E2E) quality of service (QoS) requirement of an E2E connection between the second UE and the wireless device, wherein the E2E connection includes a first hop between the UE and the second UE and a second hop between the UE and the wireless device. The processor is further configured to obtain a first hop link condition and a second hop link condition; split the E2E QoS requirement into a first hop QoS requirement and a second hop QoS requirement based on the first hop link condition and the second hop link condition; and transmit, using the transceiver, the first hop QoS requirement to the second UE. The wireless device is a third UE or a base station.

Some aspects of this disclosure relate to a method of operating operating a user equipment (UE) as a relay between a base station and a second UE. The method comprise obtaining a link condition of a second hop between UE and the second UE of an end-to-end (E2E) connection, wherein the first hop of the end-to-end (E2E) connection is between the base station and the UE. The method further comprises transmitting the link condition of the second hop to the base station and receiving, from the base station, a second hop quality of service (QoS) requirement.

Some aspects of this disclosure relate to a base station configured to serve a user equipment (UE) that is configured to provide a relay between a second UE and a wireless device, wherein an end-to-end (E2E) connection between the second UE and the wireless device includes a first hop between the second UE and the UE and a second hop between the UE and the wireless device, the base station comprising. The base station comprises a transceiver configured to enable wireless communication with the UE; and a processor, communicatively coupled to the transceiver. The processor is configured to generate a quality of service (QoS) enforcement configuration and transmit the QoS enforcement configuration to the UE. The QoS enforcement configuration includes an indication of enabling or disabling the UE to split an E2E QoS requirement associated with the E2E connection.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 3A illustrates an example of a side-link relay system connecting a user device (UE) and a base station, according to some aspects of the disclosure.

FIG. 3B illustrates an example of a side-link relay system connecting two UEs, according to aspects of the disclosure.

Figure 1:
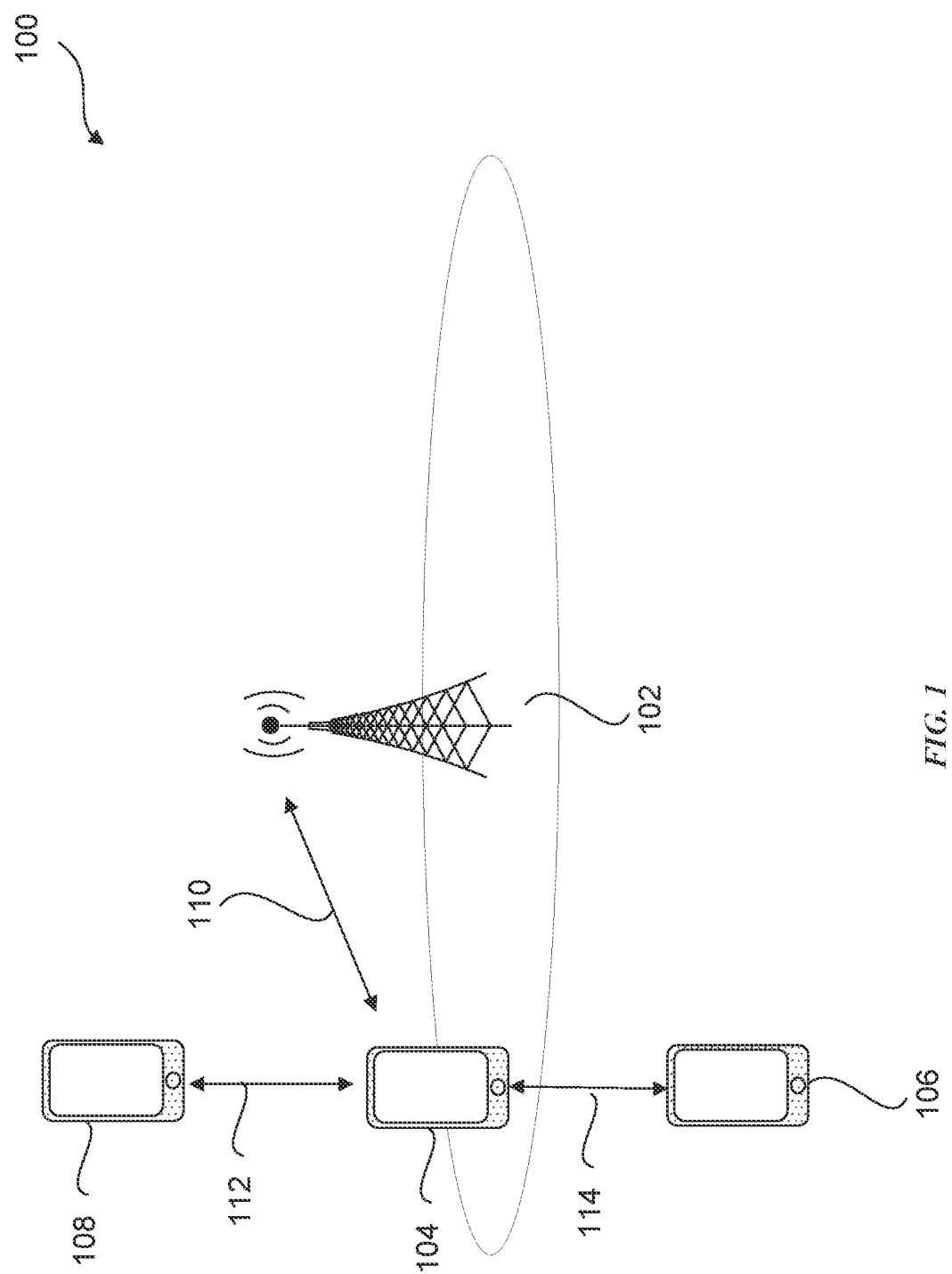
FIG. 1 illustrates an example system implementing a quality of service (QoS) enhancement for a side-link relay, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing a quality of service (QoS) enhancement for a side-link relay for 3rd Generation Partnership Project (3GPP) release 15 (Rel-15), release 16 (Rel-16), release 17 (Rel-17), and/or other 3GPP releases. For example, systems and methods are provided for implementing designs for splitting an end-to-end QoS requirement based on link conditions.

According to some aspects, a user equipment (UE) that operates according to Release 15 (Rel-15), Release 16 (Rel-16), and/or Release 17 (Rel-17) and New Radio (NR) of $5^{th}$ generation (5G) wireless technology for digital cellular networks as defined by 3rd Generation Partnership Project (3GPP) may support side-link connections with other UEs directly without connecting to a base station. For example, the UE connects with a second UE directly via a side-link connection. The UE also connects with a base station via a direct communication link, such as a Uu link. In some aspects, the second UE may be on a cell boundary of the base station or in a location not covered by the base station. The second UE may experience severe fading effects or interferences from other devices. In other words, the second UE is not able to connect with the base station directly. In some aspects, the UE relays packets between the second UE and the base station. For example, the second UE transmits a packet to the UE and the UE forwards the packet to the base station. The base station also transmits a packet to the second UE via the UE. In such a case, the second UE connects with the base station indirectly via the UE.

According to some aspects, the second UE connects with a third UE via the UE. For example, the UE connects with the third UE via a side-link connection. The second UE can transmit a packet to the UE, which forwards the packet to the third UE. In such a case, the second UE connects with the third UE indirectly via the UE.

According to some aspects, the second UE, the base station, and the third UE transmit packets with QoS requirements. For example, the QoS requirements include a priority, a packet delay budget (PDB), a packet error rate (PER), and others. A packet with a PDB of 10 ms is expected to be delivered to a destination within 10 ms. A packet may include a plurality of sub-packets. The packet is expected to have less than $10^{-2}$ PER at the destination if the QoS requirements include a PER of $10^{-2}$. In some aspects, the QoS requirements also include a bit error rate (BER) and/or a symbol error rate (SER).

In some aspects, the base station assigns communication resources to a UE based on QoS requirements. For example, the UE transmits its QoS requirements to the base station, which assigns communication resources to the UE. The communication resources include bandwidth resources, scheduling resources, code resources, spatial resources, and others. The scheduling resources relate to a PDB requirement because the UE can schedule a packet transmission within the PDB with the scheduling resources. The bandwidth resources, the code resources, and the spatial resources relate to a PER requirement. However, for indirect connections, the communication resources may not be assigned properly. For example, the second UE determines an end-to-end (E2E) QoS requirement for the indirect connection between the second UE and the base station. The indirect connection includes the side-link connection between the second UE and the UE and the Uu link connection between the UE and the base station. The base station assigns communication resources to the UE, but not the second UE because the second UE locates outside a range of the base station. In addition, the second UE connects with the UE via the side-link connection directly, not via any base stations.

According to some aspects, the UE connects with a fourth UE. Similar to the second UE, the fourth UE connects with the base station via the UE indirectly. The UE multiplexes packets received from the second and the fourth UE and forwards them to the base station. In some aspects, the UE multiplexes the packets based on channel priorities. For example, the second UE transmits to the UE via a first channel and the fourth UE transmits to the UE via a second channel. The first channel has a higher priority than the second channel. In such a case, the UE prioritizes packets received via the first channel over packets received via the second channel. In some aspects, the first channel and the second channel have a same priority. In such a case, the UE prioritizes packets based on QoS statuses. For example, a first packet received via the first channel arrives at the UE with a 10 ms delay, while a second packet received via the second channel arrives at the UE on time. The UE prioritizes the first packet because the first packet has a more urgent latency.

FIG. 1 illustrates an example system 100 implementing designs of splitting an end-to-end QoS requirement based on link conditions, according to some aspects of the disclosure. Example system 100 is provided for the purpose of illustration only and does not limit the disclosed aspects. System 100 may include, but is not limited to, a base station 102, such as a gNB, a UE 104, a UE 106, and a UE 108. The UEs 104, 106, and 108 may be implemented as electronic devices configured to operate based on a wide variety of wireless communication techniques. These techniques may include, but are not limited to, techniques based on 3rd Generation Partnership Project (3GPP) standards. For example, the UEs 104, 106, and 108 may include electronic devices configured to operate using one or more 3GPP releases, such as Release 15 (Rel-15), Release 16 (Rel-16), Release 17 (Rel-17), or other 3GPP releases. The UEs 104, 106, and 108 may include, but are not limited to, wireless communication devices, smartphones, laptops, desktops, tablets, personal assistants, monitors, televisions, wearable devices, Internet of Things (IoT) devices, vehicle communication devices, and the like. The base station 102 may include one or more nodes configured to operate based on a wide variety of wireless communication techniques such as, but not limited to, techniques based on 3GPP standards. For example, the base station 102 may include nodes configured to operate using Rel-15, Rel-16, Rel-17, or other 3GPP releases. In some aspects, the UE 104 is in a cell coverage of the base station 102 and connects with the base station 102 via a communication link 110. The communication link 110 may be a Uu link. The UE 106 and the UE 108 locate outside the cell coverage of the base station 102. For example, the UE 106 and the UE 108 may locate on a cell boundary of the base station 102 or in a location far away from the base station 102. The UE 106 and the UE 108 may experience severe fading effects or interferences from other devices. Therefore, the UE 106 and the UE 108 cannot connect with the base station 102 directly.

According to some aspects, the UE 106 and the UE 108 connect with the UE 104 directly via a communication link 114 and a communication link 112, respectively. The communication links 114 and 112 may be side-link connections. In some aspects, the UE 106 and the UE 108 can connect with the base station 102 indirectly via the UE 104. For example, the UE 106 transmits a packet to the UE 104, which forwards the packet to the base station 102. The base station 102 transmits a second packet to the UE 104, which forwards the second packet to the UE 106. In other words, the UE 106 connects with the base station 102 via a two-hop connection, wherein the communication link 114 is a first hop and the communication link 110 is a second hop.

According to some aspects, the two-hop connection has one or more E2E QoS requirements. For example, the one or more E2E QoS requirements include a priority, a packet delay budget (PDB), a packet error rate (PER), and others. A packet with a PDB of 10 ms is expected to be delivered to a destination within 10 ms. A packet may include a plurality of sub-packets. The packet is expected to have less than $10^{-2}$ PER at the destination if the one or more E2E QoS requirements include a PER of $10^{-2}$. In some aspects, the one or more E2E QoS requirements also include a bit error rate (BER) and/or a symbol error rate (SER). Because the two-hop connection includes the first and the second hops, transmissions of the first and the second hop needs to satisfy the one or more E2E QoS requirements. For example, the one or more E2E QoS requirements include a PDB of 100 ms. Therefore, a total transmission time of the first and the second hops needs to be less than 100 ms.

According to some aspects, the UE 104 splits each of the one or more E2E QoS requirements into two parts: a first hop QoS requirement corresponding to the communication link 114 and a second hop QoS requirement corresponding to the communication link 110. In some aspects, the base station 102 splits the one or more E2E QoS requirements and transmits the firs hop and the second hop QoS requirements to the UE 104 and the UE 106.

In some aspects, the UE 104 splits the one or more E2E QoS requirements with a constant ratio. For example, the UE 104 splits the E2E QoS requirement to the first hop QoS requirement and the second hop QoS requirement equally in embodiments. Alternatively, the UE 104 splits the one or more E2E QoS requirements to the first hop and the second hop QoS requirements unequally, but the QoS requirement is still represented as a ratio.

In some aspects, side-link connections, such as the communication link 114, are subject to channel resource sharing and congestions. It is more challenging for the side-link connections to fulfill a QoS requirement than for Uu links, such as the communication link 110. This is because the side-links and the Uu links have different channel environments, communication resources, power constraints, congestion scenarios, and others. Therefore, the UE 104 or the base station 102 can splits the one or more E2E QoS requirements based on link conditions of the side-links and the Uu links. For example, the one or more E2E QoS requirements include a PDB of 100 ms. The UE 104 can assign 70 ms to the communication link 114 and assign 30 ms to the communication link 110 based on link conditions of the communication link 114 and the communication link 110. The link conditions include a channel busy ratio (CBR), signal strengths such as a reference signal received power (RSRP) and a reference signal received quality (RSRQ), interference conditions, available communication resources, fading conditions, and others.

According to some aspects, the link conditions of the communication link 114 and the communication link 110 are subject to change over time. For example, the interference conditions change according to a number of nearby devices that perform transmission. The fading conditions change according to positions of the UE 106 and the UE 104. The CBR changes according to a number of packets that require transmission. Therefore, the communication link 114 and the communication link 110 may not satisfy the first hop and the second hop QoS requirements previously assigned. In such as case, the UE 104 adjusts the QoS requirements based on updated link conditions.

In some aspects, the UE 104 can adjust the first hop and the second hop QoS requirements for individual packets. For example, after the UE 104 receives a packet from the UE 106, the UE 104 determines a QoS status of the communication link 114. The QoS status indicates that the communication link 114 outperforms or underperforms the first hop QoS requirement. For example, referring to the previous example, the first hop QoS requirement is 70 ms, which means that the UE 104 needs to receive the packet within 70 ms after the UE 106 generates the packet. However, due to a change of the link condition of the communication link 114, the UE 104 receives the packet at 80 ms. Therefore, the communication link 114 creates a 10 ms excess delay. If the second hop QoS requirement remains the same, the packet will arrive at the base station 102 with a 10 ms excess delay.

In some aspects, to compensate, the UE 104 adjusts the second hop QoS requirement based on the delay of the communication link 114. For example, the UE 104 adjusts the second hop QoS requirement from 30 ms to 20 ms to mitigate the 10 ms excess. In such a case, if the communication link 110 fulfills the adjusted second hop QoS requirement, an E2E packet delivery time is 100 ms, which still satisfies the one or more E2E QoS requirements of 100 ms.

In some aspects, the UE 104 adjusts the second hop QoS requirement based on instructions of the base station 102. For example, the UE 104 transmits the QoS status of the communication link 114 to the base station 102. The base station 102 determines the adjusted second hop QoS requirement of the communication link 110 and transmits the adjusted second hop QoS requirement to the UE 104.

In some aspects, the UE 104 adjusts communication resources of the communication link 110 to allow the communication link 110 to achieve the adjusted second hop QoS requirement. In some aspects, the adjusted second hop QoS requirement can be tighter than the second hop QoS requirement assigned previously. For example, referring to the example above, the UE 104 adjusts the second hop QoS requirement from 30 ms to 20 ms. The communication link 110 is required to deliver the packet in a shorter time. In such a case, the UE 104 schedules the packet for transmission in time frames that are sooner. In some aspects, the adjusted second hop QoS requirement can be looser than the second hop QoS requirement assigned previously. For example, the UE 104 adjusts the second hop QoS requirement from 30 ms to 40 ms. This is possible when the communication link 114 outperforms the first hop QoS requirement. In such a case, the UE 104 schedules the packet for transmission in time frames that are later. The UE 104 releases time frames that were originally assigned to the packet and can use the time frames to transmit other more packets.

According to some aspects, the UE 106 cannot connect with the UE 108 directly. For example, the UE 106 and the UE 108 are far away from each other. Because the UE 106 and the UE 108 both connect with the UE 104, a two-hop connection via the UE 104 between the UE 106 and UE 108 is possible. For example, the UE 106 transmits a packet to the UE 104, which forwards the packet to the UE 108. Similar to the two-hop connection between the UE 106 and the base station 102 discussed above, the two-hop connection between the UE 106 and the UE 108 also has one or more E2E QoS requirements. The UE 104 can split the one or more E2E QoS requirements based on conditions of the communication link 114 and the communication link 112 in a similar way as discussed above.

Figure 2:
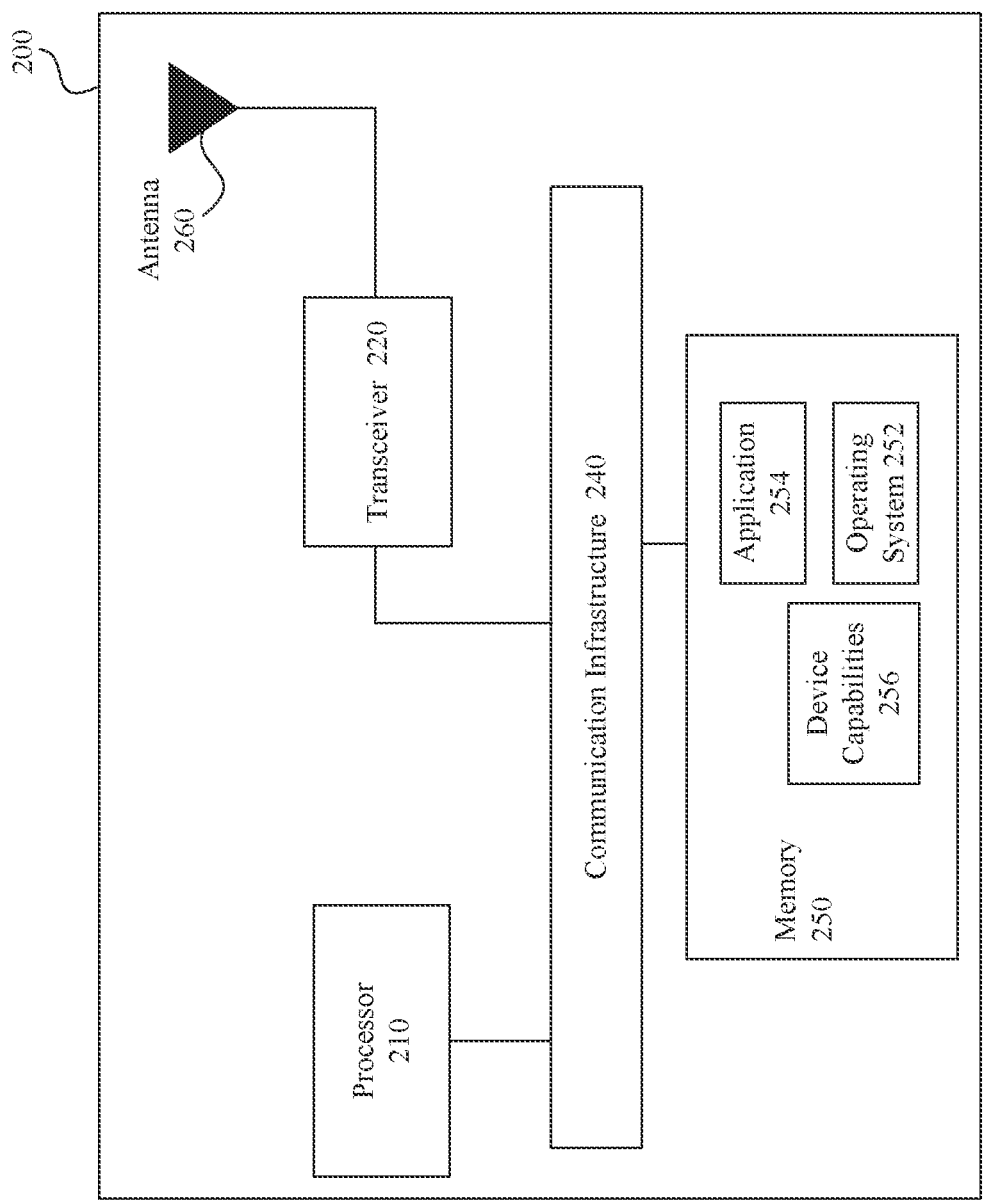
FIG. 2 illustrates a block diagram of an example system of an electronic device for the QoS enhancement, according to some aspects of the disclosure.

FIG. 2 illustrates a block diagram of an example system 200 of an electronic device implementing a QoS enhancement for a side-link relay, according to some aspects of the disclosure. The system 200 may be any of the electronic devices (e.g., the base station 102 and the UEs 104, 106, and 108) of the system 100. The system 200 includes a processor 210, one or more transceivers 220, a communication infrastructure 240, a memory 250, an operating system 252, an application 254, and one or more antennas 260. Illustrated systems are provided as exemplary parts of system 200, and system 200 may include other circuit(s) and subsystem(s). Also, although the systems of system 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by wireless system 200 and/or a user of wireless system 200. The applications in the application 254 may include applications such as, but not limited to. Siri™, FaceTime™, radio streaming, video streaming, remote control, and/or other user applications.

The system 200 may also include the communication infrastructure 240. The communication infrastructure 240 provides communication between, for example, the processor 210, the one or more transceivers 220, and the memory 250. In some implementations, the communication infrastructure 240 may be a bus.

The processor 210, alone, or together with instructions stored in the memory 250 performs operations enabling system 200 of the system 100 to implement mechanisms for the QoS enhancement for the side-link relay, as described herein. Alternatively, or additionally, the processor 210 can be "hard coded" to implement mechanisms for the QoS enhancement for the side-link relay, as described herein The one or more transceivers 220 transmit and receive communications signals support mechanisms for the QoS enhancement for the side-link relay. Additionally, the one or more transceivers 220 transmit and receive communications signals that support mechanisms for measuring communication link(s), generating and transmitting system information, and receiving the system information. According to some aspects, the one or more transceivers 220 may be coupled to antenna 260 to wirelessly transmit and receive the communication signals. Antenna 260 may include one or more antennas that may be the same or different types. The one or more transceivers 220 allow system 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, or other releases of 3GPP standard.

As discussed in more detail below with respect to FIGS. 3-8, processor 210 may implement different mechanisms for the QoS enhancement for the side-link relay as discussed with respect to the system 100 of FIG. 1.

FIG. 3A illustrates an example system of a side-link relay system connecting a UE and a base station. Example system 300 is provided for the purpose of illustration only and does not limit the disclosed aspects. System 300 may include, but is not limited to, the UE 106, the UE 104, and the base station 102. Similar to the discussion above, the UE 106 connects with the base station 102 via a two-hop connection 302. The two-hop connection 302 includes a first hop 304 and a second hop 306.

According to some aspects, the two-hop connection 302 has one or more E2E QoS requirements. For example, the one or more E2E QoS requirements include a priority, a PDB, a PER, and others. The first hop 304 and the second hop 306 also have one or more first hop QoS requirements and one or more second hop QoS requirements, respectively. A combination of the one or more first hop and second hop QoS requirements need to satisfy the one or more E2E QoS requirements. For example, the one or more E2E QoS requirements include a PDB of $X_1$ ms. The one or more first hop QoS requirements include a first PDB of $X_1$ ms and the one or more second hop QoS requirements include a second PDB of $X_2$ ms. To satisfy the PDB, $X_1$ and $X_2$ need to satisfy $X_1+X_2 \leq X$. The one or more E2E QoS requirements may also include a PER of E. The one or more first hop QoS requirements include a first PER of $E_1$ and the one or more second hop QoS requirements include a second PER of $E_2$. To satisfy the PER, $E_1$ and $E_2$ need to satisfy $(1-E_1) \times (1-E_2) \leq (1-E)$. The one or more E2E QoS requirements may also include a priority of Y. The one or more first hop QoS requirements include a first priority of $Y_1$ and the one or more second hop QoS requirements include a second priority of $Y_2$. To satisfy the priority, $Y_2$ needs to satisfy $Y_2 \leq Y$. Here, a lower priority value corresponds to a higher priority.

According to some aspects, the UE 104 determines the one or more first hop and second hop QoS requirements based on link conditions of the first hop 304 and the second hop 306. For example, the link conditions include CBRs of the first hop 304 and the second hop 306. A higher CBR value corresponds to a more severe congestion condition in a communication link. If a CBR of the first hop 304 is larger than a CBR of the second hop 306, the UE 104 determines that the first PDB is larger than the second PDB, i.e., $X_1 > X_2$. This is because the first hop 304 is expected to experience a more severe congestion than the second hop 306. Therefore, a looser QoS requirement of the PDB is assigned to the first hop 304. In some aspects, the link conditions include signal strengths, such as an RSRP and an RSRQ, of the first hop 304 and the second hop 306. A higher signal strength value may correspond to a higher signal-to-noise ratio (SNR) at a receiver side of a communication link. In addition, a higher SNR may correspond to a lower PER. If a signal strength of the first hop 304 is smaller than a signal strength of the second hop 306, the UE 104 determines that the first PER is larger than the second PER, i.e., $E_1 > E_2$. This is because the PER of the first hop 304 is expected to be higher than the PER of the second hop 306. Therefore, a looser QoS requirement of PER is assigned to the first hop 304.

In some aspects, the UE 104 determines the one or more first hop and second hop QoS requirements proportionally to the link conditions. For example, the CBR of the first hop 304 is $C_1$ and the CBR of the second hop 306 is $C_2$. The UE 104 determines that the $$X_1 = \frac{C_1 X}{C_1 + C_2} \text{ and } X_2 = \frac{C_2 X}{C_1 + C_2}.$$

In some aspects, the UE 104 determines the one or more first hop and second hop QoS requirements based on a splitting table. The splitting table includes a plurality of dimensions. Each dimension corresponds to one kind of first hop and second hop QoS requirements. For example, Table 1 shown below corresponds to the PDB QoS requirements. If the first hop 304 has a CBR value of $C_1$–3 and the second hop 306 has a CBR value of $C_2$–4, the UE 104 determines that the first PDB of the first hop 304 is $X_1$–34 and the second PDB of the second hop 306 is $X_2$–34. In other words, the UE 104 determines the one or more first hop and second hop QoS requirements by accessing the splitting table. In some aspects, a CBR value may not be listed in the splitting table. For example, the first hop 304 has a CRB value $C_1$–n, wherein $C_1$–1<$C_1$–n<$C_1$–2. The second hop 306 has a CRB value $C_2$–1. The UE 104 determines that the first PDB to be a value between $X_1$–11 and $X_1$–21 and the second PDB to be a value between $X_2$–11 and $X_2$–21.

TABLE 1

Splitting Table.

| Second hop | First hop | | | | |
|---|---|---|---|---|---|
| | $C_1$-1 | $C_1$-2 | $C_1$-3 | $C_1$-4 | $C_1$-5 |
| $C_2$-1 | $X_1$-11, $X_2$-11 | $X_1$-21, $X_2$-21 | $X_1$-31, $X_2$-31 | $X_1$-41, $X_2$-41 | $X_1$-51, $X_2$-51 |
| $C_2$-2 | $X_1$-12, $X_2$-12 | $X_1$-22, $X_2$-22 | $X_1$-32, $X_2$-32 | $X_1$-42, $X_2$-42 | $X_1$-52, $X_2$-52 |
| $C_2$-3 | $X_1$-13, $X_2$-13 | $X_1$-23, $X_2$-23 | $X_1$-33, $X_2$-33 | $X_1$-43, $X_2$-43 | $X_1$-53, $X_2$-53 |
| $C_2$-4 | $X_1$-14, $X_2$-14 | $X_1$-24, $X_2$-24 | $X_1$-34, $X_2$-34 | $X_1$-44, $X_2$-44 | $X_1$-54, $X_2$-54 |
| $C_2$-5 | $X_1$-15, $X_2$-15 | $X_1$-25, $X_2$-25 | $X_1$-35, $X_2$-35 | $X_1$-45, $X_2$-45 | $X_1$-55, $X_2$-55 |

In some aspects, the splitting table also includes the one or more first hop and second hop QoS requirements, such as the PER and the priority. For example, the UE 104 determines the PER of the first hop 304 and the PER of the second hop 306 based on the splitting table similarly as discussed above.

In some aspects, the UE 104 receives the splitting table from the base station 102. The base station 102 generates the splitting table. In other aspects, the base station 102 receives the splitting table from a core network. For example, the base station 102 receives the splitting table from a policy control function (PFC) of the core network.

In some aspects, the UE 104 determines the one or more first hop and second hop QoS requirements based on instructions received from the base station 102. For example, the UE 104 transmits the link conditions of the first hop 304 and the second hop 306 to the base station 102. The base station 102 determines the one or more first hop and second hop QoS requirements and transmits them to the UE 104.

In some aspects, the UE 104 measures the link conditions of the first hop 304 and the second hop 306. For example, the UE 104 measures the signal strength of the first hop 304 by measuring received signals from the UE 106. The UE 104 also measures the CBR of the second hop 306 by measuring a number of nearby devices and their transmission rates. In some aspects, the UE 104 receives the link conditions from other devices such as the UE 106 and the base station 102. For example, the UE 104 receives the CBR of the first hop 304 from the UE 106 and receives the signal strength of the second hop 306 from the base station 102. In some aspects, the UE 104 transmits the link conditions that are unknown to the base station 102 to the base station 102 for determining the one or more first hop and second hop QoS requirements. For example, the UE 104 transmits the CBR of the second hop 306 to the base station 102.

In some aspects, the UE 104 updates the one or more first hop and second hop QoS requirements based on updated link conditions of the first hop 304 and the second hop 306. For example, the CBR of the first hop 304 and the CBR of the second hop 306 are updated periodically or on-demand when the CBRs change. In some aspects, the first hop 304 is less capable or stable than the second hop 306. For example, the first hop 304 is subjected to a more strict power constraint than the second hop 306. The first hop 304 may suffer from a more severe fading effect than the second hop 306 because both the UE 106 and the UE 104 of the first hop 304 are mobile. Therefore, the UE 104 updates the one or more first hop and second hop QoS requirements based solely on the link conditions of the first hop 304. In other words, the UE 104 presumes that the link conditions of the second hop 306 do not change. In some aspects, because the second hop 306 is more stable as explained above, the UE 104 determines that the one or more first hop QoS requirements are looser than the one or more second hop QoS requirements even if the link conditions of the first hop 304 and the second hop 306 are the same. For example, as shown in Table 1, the UE 104 determines that $X_1$–33 is greater than $X_2$–33, even if $C_1$–3=$C_2$–3.

FIG. 3B illustrates an example system of a side-link relay system connecting multiple UEs. Example system 300 is provided for the purpose of illustration only and does not limit the disclosed aspects. System 300 may include, but is not limited to, the UE 104, the UE 106, and the UE 108.

Similar to the discussion above, the UE 106 connects with the UE 108 via a two-hop connection 308. The two-hop connection 308 includes a first hop 310 and a second hop 312.

According to some aspects, similar as discussed above, the two-hop connection 308 has one or more $E_2E$ QoS requirements. For example, the one or more $E_2E$ QoS requirements include a priority, a PDB, a PER, and others. The first hop 310 and the second hop 312 also have one or more first hop QoS requirements and one or more second hop QoS requirements, respectively. A combination of the one or more first hop and second hop QoS requirements need to satisfy the one or more $E_2E$ QoS requirements. Regarding the PDB and the PER. The one or more first hop and second hop QoS requirements satisfy the one or more $E_2E$ QoS requirements in a same way as described in FIG. 3A discussed above. Regarding the priority, the one or more $E_2E$ QoS requirements may include a priority of Y. The one or more first hop QoS requirements include a first priority of $Y_1$ and the one or more second hop QoS requirements include a second priority of $Y_2$. To satisfy the priority, $Y_1$ and $Y_2$ need to satisfy $Y_2 \leq Y$ and $Y_1 \leq Y$. Here, a lower priority value corresponds to a higher priority.

In some aspects, the UE 104 determines the one or more first hop and second hop QoS requirements similarly as discussed in FIG. 3A above. For example, the UE 104 determines the one or more first hop and second hop QoS requirements based on relative values of link conditions of the first hop 310 and the second hop 312. The UE 104 determines the one or more first hop and second hop QoS requirements based on a ratio between the link conditions of the first hop 310 and the second hop 312. The UE 104 determines the one or more first hop and second hop QoS requirements based on a second splitting table. The UE 104 receives the second splitting table from the base station 102. In some aspects, the second splitting table has a similar structure to the splitting table discussed in FIG. 3A. For example, for each kind of QoS requirement, such as the PDB, the UE 104 looks up the second splitting table based on the link conditions to determine a first PDB of the first link 310 and a second PDB of the second link 312. On the other hand, unlike the two-hop connection 302 of FIG. 3A, which includes the second hop 306 that is a Uu link connection, the two-hop connection 308 of FIG. 3B includes the first hop 310 and the second hop 312 that are both side-link connections. Therefore, in the second splitting table, if the channel conditions of the first hop 310 and the second hop 312 are the same, the one or more first hop and second hop QoS requirements are the same.

In some aspects, the UE 104 determines the one or more first hop and second hop QoS requirements based on instructions received from the base station 102. For example, the UE 104 transmits the link conditions of the first hop 310 and the second hop 312 to the base station 102. The base station 102 determines the one or more first hop and second hop QoS requirements and transmits them to the UE 104. In some aspects, because the base station 102 is not a part of the two-hop connection 308, the UE 104 gathers all the link conditions of the first hop 310 and the second hop 312 and transmits them to the base station 102.

Figure 4A:
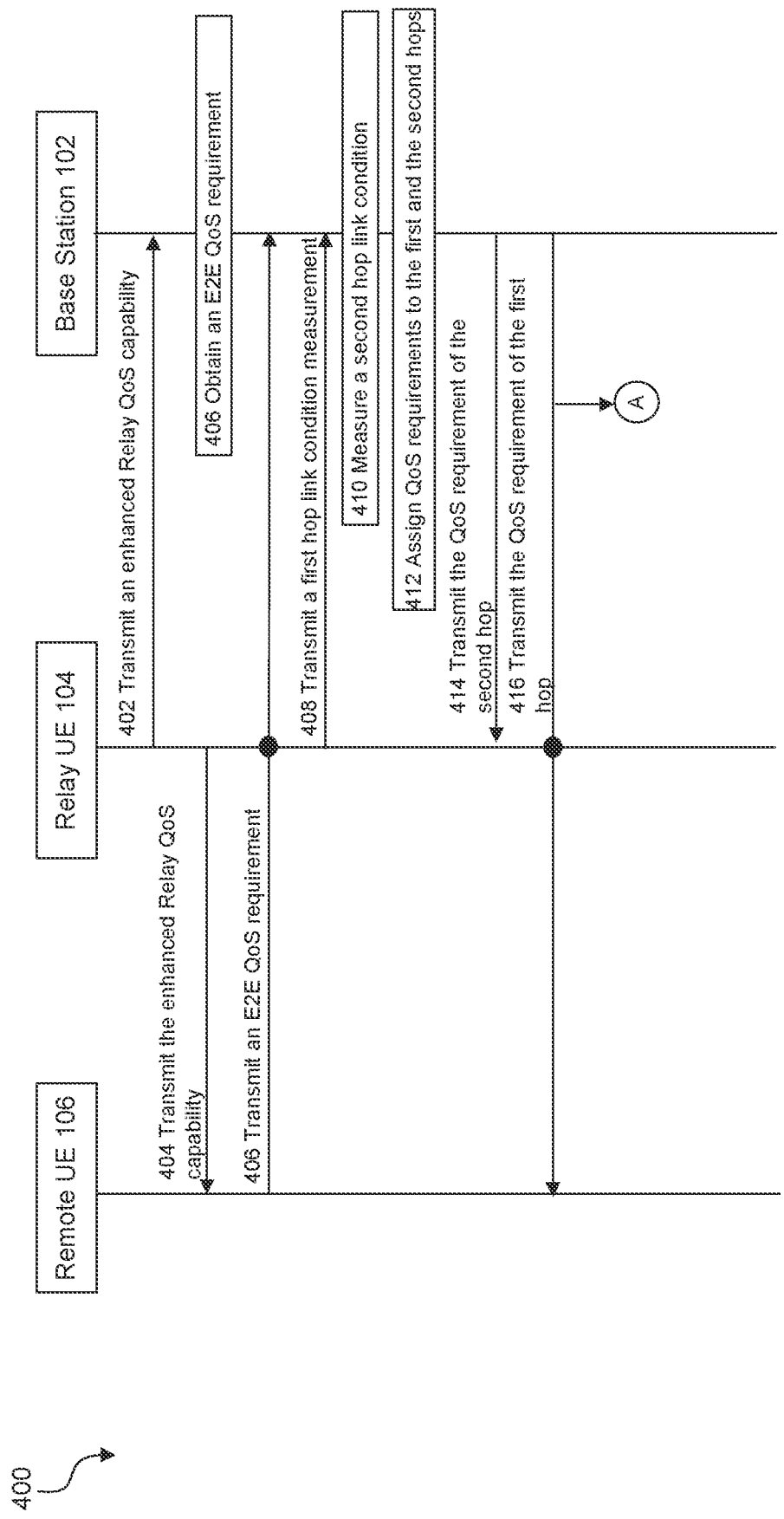
FIGS. 4A and 4B illustrate an example method for assigning per-hop QoS based on instructions from a base station and adjusting communication resources, according to aspects of the disclosure.
Figure 4B:
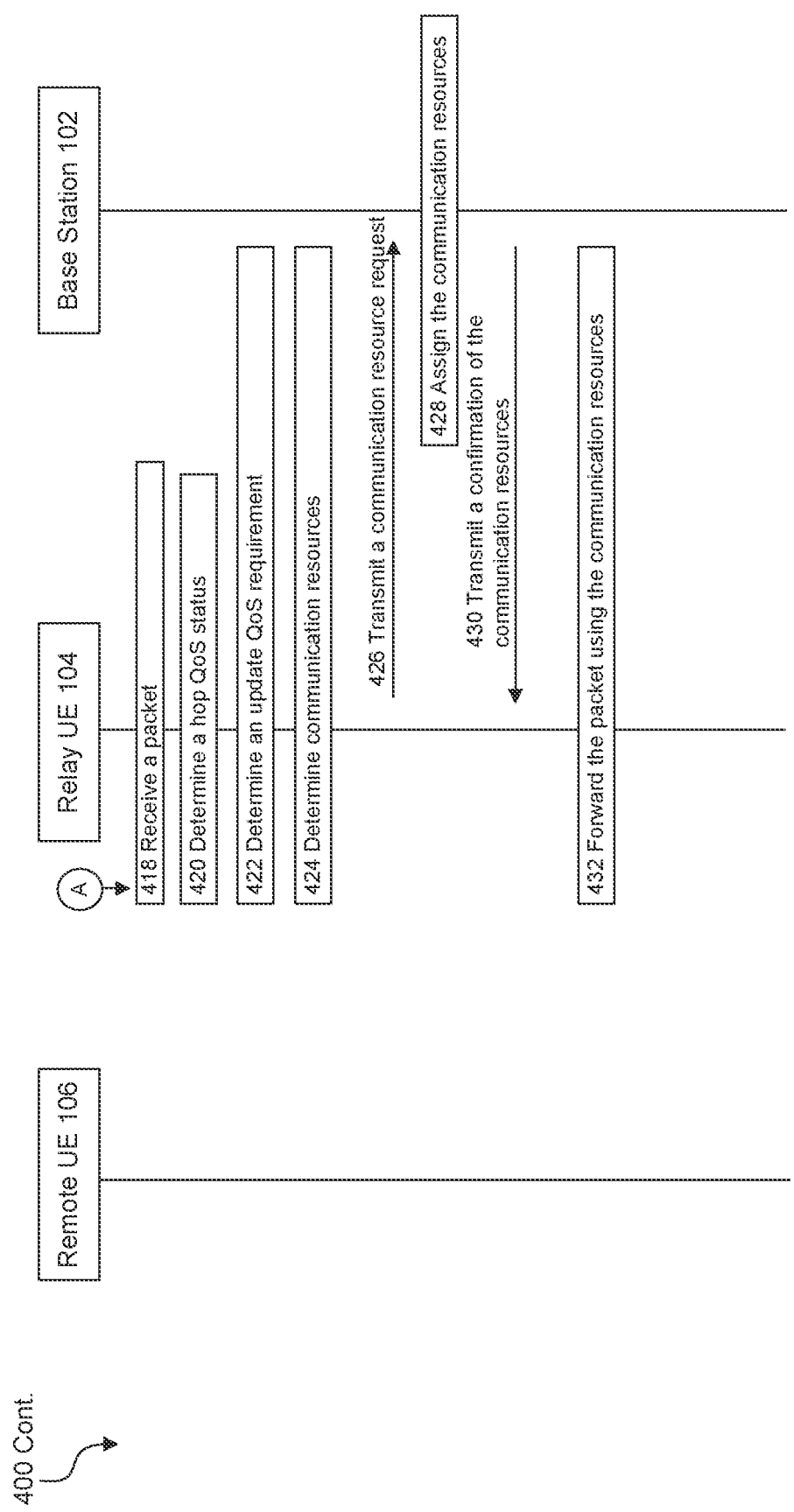

FIGS. 4A-4B illustrate an example method 400 for a system implementing a QoS enhancement for a side-link relay. As a convenience and not a limitation, FIG. 4 may be described with regard to elements of FIGS. 1, 2, 3, and 8. Method 400 may represent the operation of electronic devices (for example, the base stations 102, the UE 104, and the UE 106 of FIG. 1) implementing the QoS enhancement for the side-link relay. For the sake of demonstration, the UE 104 is referred to as a relay UE 104 and the UE 106 is referred to as a remote UE 106. The remote UE 106 connects with the base station 102 by a two-hop connection via the relay UE 104. The two-hop connection includes a first hop between the remote UE 106 and the relay UE 104 and a second hop between the relay UE 104 and the base station 102. Method 400 may also be performed by system 200 of FIG. 2 and/or computer system 800 of FIG. 8. But method 400 is not limited to the specific aspects depicted in those figures and other systems may be used to perform the method, as will be understood by those skilled in the art. It is to be appreciated that not all operations may be needed, and the operations may not be performed in the same order as shown in FIG. 4.

At 402, the relay UE 104 transmits an enhanced relay QoS capability message to the base station 102. The enhanced relay QoS capability message indicates that the relay UE 104 is capable of splitting one or more $E_2E$ QoS requirements for a multi-hop connection, such as the two-hop connection between the remote UE 106 and the base station 102, as discussed above. In addition, the enhanced relay QoS capability message also indicates that the relay UE 104 is capable of adjusting QoS requirements for a hop connection, such as the second hop, based on a received packet.

At 404, the relay UE 104 transmits the enhanced relay QoS capability message to the remote UE 106. The enhanced relay QoS capability message may be identical to the one that is sent to the base station 102 in 402. In response to receiving the enhanced relay QoS capability, the remote UE 106 enables an outlier mode by transmitting packets when the remote UE 106 expects that the packets do not meet QoS requirements of the first hop. For example, the remote UE 106 transmits a packet even when the remote UE 106 expects that the packet will arrive at the relay UE 104 with an excess delay, such as a 10 ms delay. This is because the remote UE 106 expects that the second hop will make up for the 10 ms delay based on the enhanced relay QoS capability message.

At 406, the base station 102 obtains an $E_2E$ QoS requirement corresponding to the two-hop connection between the remote UE 106 and the base station 102. The $E_2E$ QoS requirement includes a priority, a PDB, a PER, or others. In an uplink scenario, the remote UE 106 determines the $E_2E$ QoS requirement. The remote UE 106 can determine the $E_2E$ QoS requirement based on instructions received from an application of the remote UE 106, such as the application 254 of the FIG. 2. The remote UE 106 can also receive the $E_2E$ QoS requirement from a user of the remote UE 106. Furthermore, the remote UE 106 transmits the $E_2E$ QoS requirement to the base station 102 via the relay UE 104. In a downlink scenario, the base station 102 determines the $E_2E$ QoS requirement. The base station 102 may also transmits the $E_2E$ QoS requirement to the relay UE 104.

At 408, the relay UE 104 transmits a first hop link condition measurement to the base station 102. The first hop link condition measurement includes a CBR of the first hop, a signal strength of the first hop, i.e., a side-link reference signal received power (SL-RSRP), an interference level of the first hop, and others. The relay UE 104 measures a first hop link condition at the relay UE 104. For example, the relay UE 104 measures a signal strength of the first hop based on signals received at the relay UE 104. The relay UE 104 also receives the first hop link condition from the remote UE 106. For example, the remote UE 106 measures a CBR of the first hop and transmits the CBR to the relay UE 104.

At 410, the base station 102 measures a second hop link condition. For example, the base station 102 measures a signal strength of the second hop based on signals received at the base station 102. In some aspects, the base station 102 receives the second hop link condition. For example, the base station 102 receives a CBR of the second hop from the relay UE 104. In some aspects, the second hop is a Uu link. The second hop link condition is measured based on radio resource measurement (RRM).

At 412, the base station 102 assigns QoS requirements for the first hop and the second hop based on the link conditions of the first hop and the second hop. The base station 102 can assign the QoS requirements based on a splitting table as discussed above in FIG. 3A. In some aspects, the base station 102 transmits the splitting table to the relay UE 104 and the relay UE 104 assigns the QoS requirements based on the splitting table.

At 414, the base station 102 transmits the QoS requirement of the second hop to the relay UE 104. In some aspects, the base station 102 also assigns corresponding communication resources to the second hop and notifies the relay UE 104. The relay UE 104 adjusts the second hop connection based on the QoS requirement and the communication resources.

At 416, the base station 102 transmits the QoS requirement of the first hop to the remote UE 106 via the relay UE 104. The remote UE 106 and the relay UE 104 adjust the first hop connection based on the QoS requirement. In some aspects, the remote UE 106 and the relay UE 104 adjust communication resources of the first hop based on the QoS requirement.

At 418, the relay UE 104 receives a packet. The packet has information corresponding to the $E_2E$ QoS requirement. For example, the information includes a packet generating time and an expected arrival time at a destination. The difference between the packet generating time and the expected arrival time at the destination is less than the PDB of the $E_2E$ QoS requirement. In other words, the packet needs to be delivered to the destination within the PDB of the $E_2E$ QoS requirement. In some aspects, the relay UE 104 receives the packet from the remote UE 106. In such a case, the packet is an uplink packet and the destination is the base station 102. In other aspects, the relay UE 104 receives the packet from the base station 102. In such a case, the packet is a downlink packet and the destination is the remote UE 106.

At 420, the relay UE 104 determines a hop QoS status. In the uplink scenario, the hop QoS status is a first hop QoS status. The first hop QoS status indicates whether or not the first hop fulfills the QoS requirement of the first hop. For example, the QoS requirement of the first hop includes a PDB of 70 ms. The relay UE 104 determines a current time of receiving the packet and subtracts the packet generating time included in the packet to obtain a first hop transmission time of 80 ms. In such a case, the first hop QoS status indicates an excess delay of 10 ms. In the downlink scenario, the hop QoS status is a second hop QoS status corresponding the second hop. The relay UE 104 determines the second hop QoS status similarly as the first hop QoS status.

At 422, the relay UE 104 determines an updated QoS requirement. For example, in the uplink scenario, the QoS requirement of the second hop includes a PDB of 30 ms. Based on the delay of the first hop QoS status, the relay UE 104 updates the QoS requirement of the second hop to be 20 ms. In this way, the second hop makes up the excess delay of the first hop and the packet is expected to arrive at the base station 102 within an expected delay. On the other hand, in the downlink scenario, the relay UE 104 updates the QoS requirement of the first hop similarly as discussed above.

At 424, the relay UE 104 determines communication resources based on the updated QoS requirement. For example, in the uplink scenario, the relay UE 104 updates the QoS requirement of the second hop from 30 ms to 20 ms to mitigate the excess 10 ms delay per the continuing example. The relay UE 104 determines that time frames closer to the current time are needed for transmitting the packet in the second hop. In the downlink scenario, the relay UE 104 may also determine communication resources of the first hop.

At 426, the relay UE 104 transmits a communication resource request to the base station 102. The communication resource request indicates the communication resources. In some aspects, the relay UE 104 connects with the base station via a first channel and a second channel. The first channel corresponds to a first logical channel group and the second channel corresponds to a second logical channel group. The first logical channel group has a higher priority than the second logical channel group. For example, if the communication resource request corresponds to the first logical channel group, the base station 102 is more likely to grant the communication resources. Otherwise, the base station 102 may ignore the communication resource request. The relay UE 104 indicates in the communication resource request whether the communication resources correspond to the first logical channel group or the second logical channel group. The relay UE 104 can improve a chance of receiving the communication resources by indicating the first logical channel group in the communication resource request regardless. For example, the communication resources correspond to the second logical channel group. Nevertheless, the relay UE 104 indicates in the communication resource request that the communication resources correspond to the first logical channel group. In some aspects, the relay UE 104 assigns the communication resources to the second hop without permission from the base station 102.

At 428, the base station 102 assigns the communication resources to the second hop or the first hop based on the communication resource request. In some aspects, the base station 102 assigns based on the logical channel group corresponding to the communication resources.

At 430, the base station 102 transmits a confirmation of the communication resources to the relay UE 104. The confirmation indicates the communication resources of the communication resource request are granted. In some aspects, the confirmation indicates communication resources that are different from the communication resources of the communication resource request. For example, the base station 102 determines that the communication resources indicated by the communication resource request are not available or not suitable.

At 432, the relay UE 104 forwards the packet using the communication resources that are granted by the base station. For example, in the uplink scenario, the relay UE 104 adjusts the second hop connection based on the communication resources and the updated QoS requirement of the second hop and transmits the packet using the adjusted second hop connection. In the downlink scenario, the relay UE 104 forwards the packet to the remote UE 106 using the communication resources assigned.

Figure 5A:
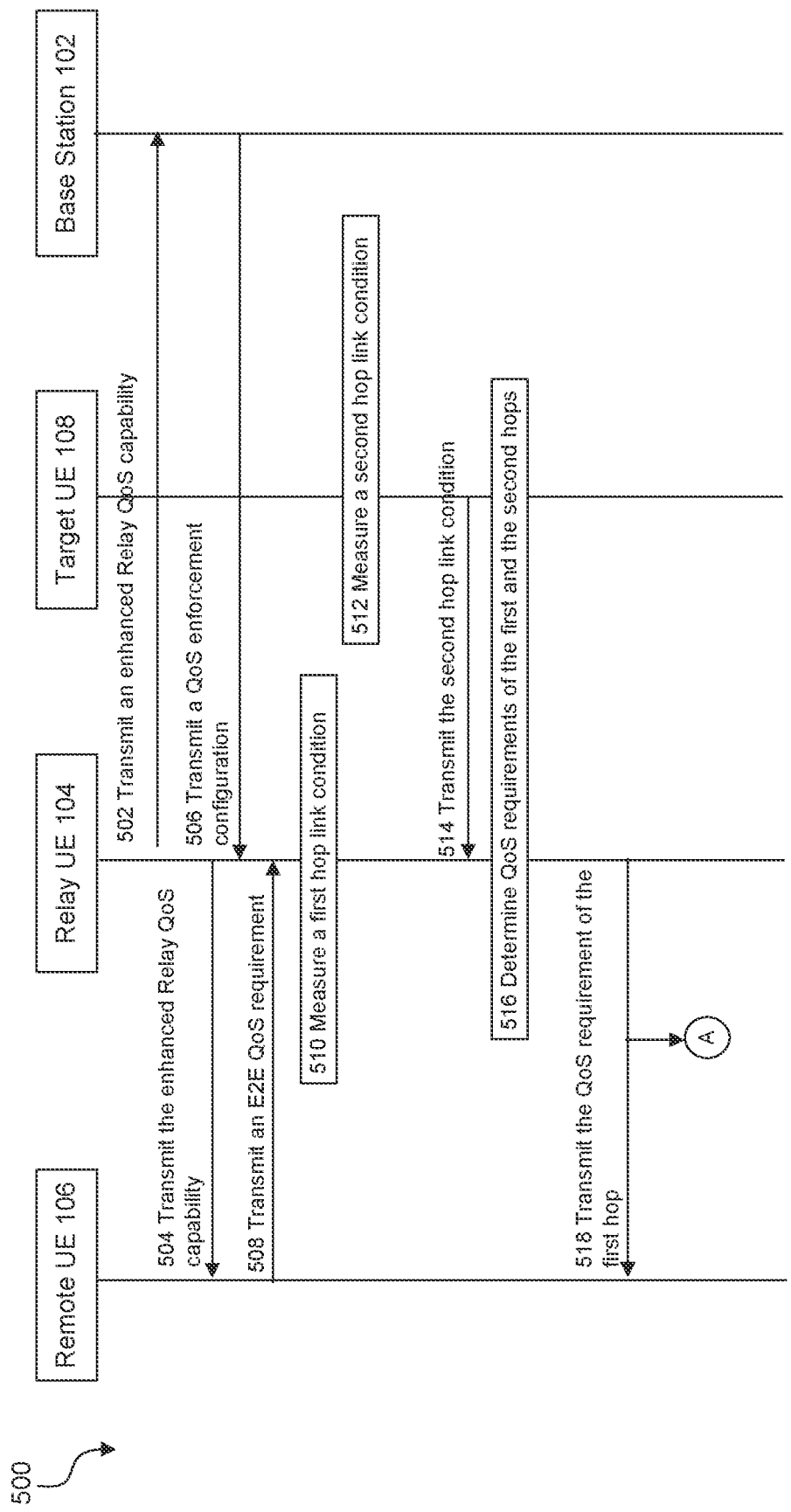
FIGS. 5A and 5B illustrate an example method for assigning per-hop QoS by a relay UE and adjusting communication resources, according to aspects of the disclosure.
Figure 5B:
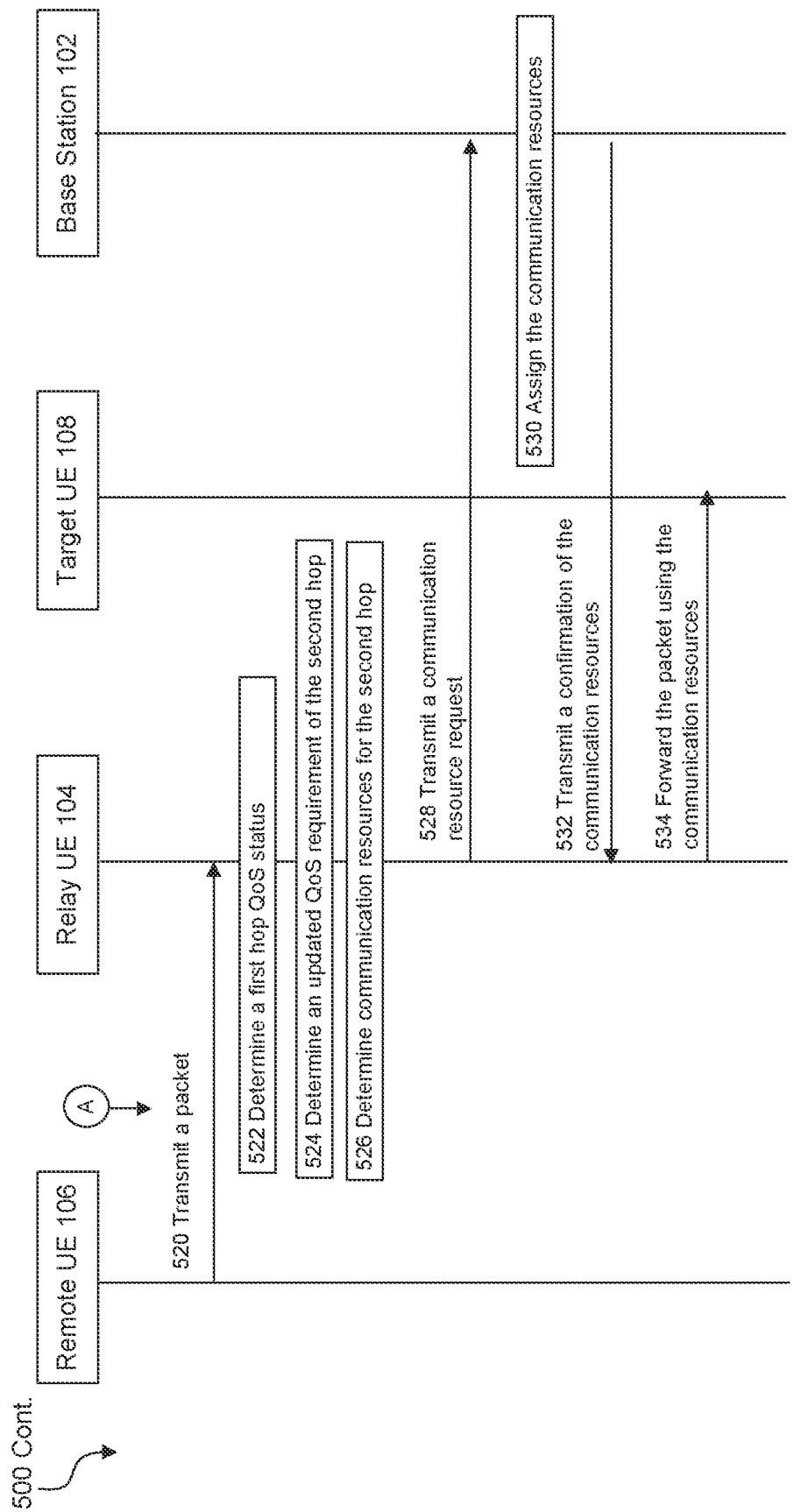

FIGS. 5A-5B illustrate an example method 500 for a system implementing a QoS enhancement for a side-link relay. As a convenience and not a limitation, FIG. 5 may be described with regard to elements of FIGS. 1, 2, 3, and 8.

Method 500 may represent the operation of electronic devices (for example, the base stations 102, the UE 104, the UE 106, and the UE 108 of FIG. 1) implementing the QoS enhancement for the side-link relay. For the sake of demonstration, the UE 104 is referred to as a relay UE 104; the UE 106 is referred to as a remote UE 106; and the UE 108 is referred to as a target UE 108. The remote UE 106 connects with the target UE 108 by a two-hop connection via the relay UE 104. The two-hop connection includes a first hop between the remote UE 106 and the relay UE 104 and a second hop between the relay UE 104 and the target UE 108. Method 500 may also be performed by system 200 of FIG. 2 and/or computer system 800 of FIG. 8. But method 500 is not limited to the specific aspects depicted in those figures and other systems may be used to perform the method, as will be understood by those skilled in the art. It is to be appreciated that not all operations may be needed, and the operations may not be performed in the same order as shown in FIG. 5.

At 502, the relay UE 104 transmits an enhanced relay QoS capability message to the base station 102. The enhanced relay QoS capability message indicates that the relay UE 104 is capable of splitting one or more $E_2E$ QoS requirements for a multi-hop connection, such as the two-hop connection between the remote UE 106 and the target UE 108, as discussed above. In addition, the enhanced relay QoS capability, message also indicates that the relay UE 104 is capable of adjusting QoS requirements for a hop connection, such as the second hop, based on a received packet.

At 504, the relay UE 104 transmits the enhanced relay QoS capability message to the remote UE 106. The enhanced relay QoS capability message may be identical to the one that is sent to the base station 102 in 402. In response to receiving the enhanced relay QoS capability, the remote UE 106 enables an outlier mode by transmitting packets even when the remote UE 106 expects that the packets do not meet QoS requirements of the first hop. For example, the remote UE 106 transmits a packet even when the remote UE 106 expects that the packet will arrive at the relay UE 104 with an excess delay, e.g., 10 ms delay. This is because the remote UE 106 expects that the second hop will make up for the 10 ms delay based on the enhanced relay QoS capability message.

At 506, the base station 102 transmits a QoS enforcement configuration to the relay UE 104. In some aspects, the QoS enforcement configuration enables or disables enhanced relay QoS functions of the relay UE 104. For example, the QoS enforcement configuration instructs the relay UE 104 whether to split one or more $E_2E$ QoS requirements of the two-hop connection. In addition, the QoS enforcement configuration instructs the relay UE 104 whether to adjust QoS requirements of the second hop based on the received packet. In some aspects, the QoS enforcement configuration further includes a splitting table as discussed in FIG. 3A. The relay UE 104 can split the one or more $E_2E$ QoS requirements based on the splitting table. In some aspects, if a radio resource control (RRC) connection between the relay UE 104 and the base station 102 is idle or inactive, the base station 102 includes the QoS enforcement configuration in a system information block (SIB) and transmits the SIB to the relay UE 104. If the RRC connection is active, the base station 102 transmits the QoS enforcement configuration through a dedicated RRC connection. If the relay UE 104 is out of coverage of the base station 102, the relay UE 104 uses a QoS enforcement configuration previously received or pre-configured.

At 508, the remote UE 106 transmits an $E_2E$ QoS requirement to the relay UE 104. The $E_2E$ QoS requirement includes a priority, a PDB, a PER, or others. The remote UE 106 receives the $E_2E$ QoS requirement from an application of the remote UE 106, such as the application 254 of the FIG. 2. The remote UE 106 can also receive the $E_2E$ QoS requirement from a user of the remote UE 106.

At 510, the relay UE 104 measures a first hop link condition at the relay UE 104. The first hop link condition includes a CBR of the first hop, a signal strength of the first hop, an interference level of the first hop, and others. For example, the relay UE 104 measures a signal strength of the first hop based on signals received at the relay UE 104. The relay UE 104 also receives the first hop link condition from the remote UE 106. For example, the remote UE 106 measures a CBR of the first hop and transmits the CBR to the relay UE 104.

At 512, the target UE 108 measures a second hop link condition. For example, the target UE 108 measures a signal strength of the second hop based on signals received at the target UE 108.

At 514, the target UE 108 transmits the second hop link condition to the relay UE 104. In some aspects, the target UE 108 only transmits the second link condition that is unknown to the relay UE 104. For example, the target UE 108 does not transmit a CBR of the second hop because the relay UE 104 can measure the CBR of the second hop.

At 516, the relay UE 104 determines the QoS requirements to the first hop and the second hop based on the link conditions of the first hop and the second hop. The relay UE 104 can assign the QoS requirements based on the splitting table received from the base station 102. In some aspects, the relay UE 104 determines the QoS requirements based on instructions from the base station 102. For example, the relay UE 104 transmits the link conditions of the first and the second hops to the base station 102. The base station 102 determines the QoS requirements based on the link conditions and transmits the QoS requirements to the relay UE 104.

At 518, the relay UE 104 transmits the QoS requirement of the first hop to the remote UE 106. The remote UE 106 and the relay UE 104 adjust the first hop connection based on the QoS requirement of the first hop. In some aspects, the remote UE 106 and the relay UE 104 adjust communication resources of the first hop based on the QoS requirement.

At 520, the remote UE 106 transmits a packet to the relay UE 104. The packet has information corresponding to the $E_2E$ QoS requirement. For example, the information includes a packet generating time and an expected arrival time at the base station 102. The difference between the packet generating time and the expected arrival time at the base station 102 is less than the PDB of the $E_2E$ QoS requirement. In other words, the packet needs to be delivered to the base station 102 within the PDB of the $E_2E$ QoS requirement.

At 522, the relay UE 104 determines a first hop QoS status. In some aspects, the first hop QoS status indicates whether or not the first hop fulfills the QoS requirement of the first hop. For example, the QoS requirement of the first hop includes a PDB of 70 ms. The relay UE 104 determines a current time of receiving the packet and subtracts the packet generating time included in the packet to obtain a first hop transmission time of 80 ms. In such a case, the first hop QoS status indicates an excess delay of 10 ms.

At 524, the relay UE 104 determines an updated QoS requirement of the second hop. For example, the QoS requirement of the second hop includes a PDB of 30 ms.

Based on the delay of the first hop QoS status, the UE 104 determines that the updated QoS requirement of the second hop be 20 ms. In this way, the second hop makes up the excess delay of the first hop and the packet is expected to arrive at the base station 102 without a delay.

At 526, the relay UE 104 determines communication resources of the second hop based on the updated QoS requirement of the second hop. For example, the relay UE 104 updates the QoS requirement of the second hop from 30 ms to 20 ms. The relay UE 104 determines that time frames closer to the current time are needed for transmitting the packet.

At 528, the relay UE 104 transmits a communication resource request to the base station 102. The communication resource request indicates the communication resources of the second hop. In some aspects, the relay UE 104 connects with the base station via a first channel and a second channel. The first channel corresponds to a first logical channel group and the second channel corresponds to a second logical channel group. The first logical channel group has a higher priority than the second logical channel group. For example, if the communication resource request corresponds to the first logical channel group, the base station 102 is more likely to grant the communication resources. Otherwise, the base station 102 may ignore the communication resource request. The relay UE 104 indicates in the communication resource request whether the communication resources correspond to the first logical channel group or the second logical channel group. The relay UE 104 can improve a chance of receiving the communication resources by indicating first logical channel group in the communication resource request regardless. For example, the communication resources correspond to the second logical channel group. Nevertheless, the relay UE 104 indicates in the communication resource request that the communication resources correspond to the first logical channel group. In some aspects, the relay UE 104 assigns the communication resources to the second hop without permission from the base station 102.

At 530, the base station 102 assigns the communication resources to the second hop based on the communication resource request. In some aspects, the base station 102 assigns based on the logical channel group corresponding to the communication resources.

At 532, the base station 102 transmits a confirmation of the communication resources to the relay UE 104. The confirmation indicates the communication resources of the communication resource request are granted. In some aspects, the confirmation indicates communication resources that are different from the communication resources of the communication resource request. For example, the base station 102 determines that the communication resources indicated by the communication resource request are not available or not suitable.

At 534, the relay UE 104 forwards the packet to the target UE 108 using the granted communication resources. For example, the relay UE 104 adjusts the second hop connection based on the communication resources and the updated QoS requirement of the second hop and transmits the packet using the adjusted second hop connection.

Figure 6:
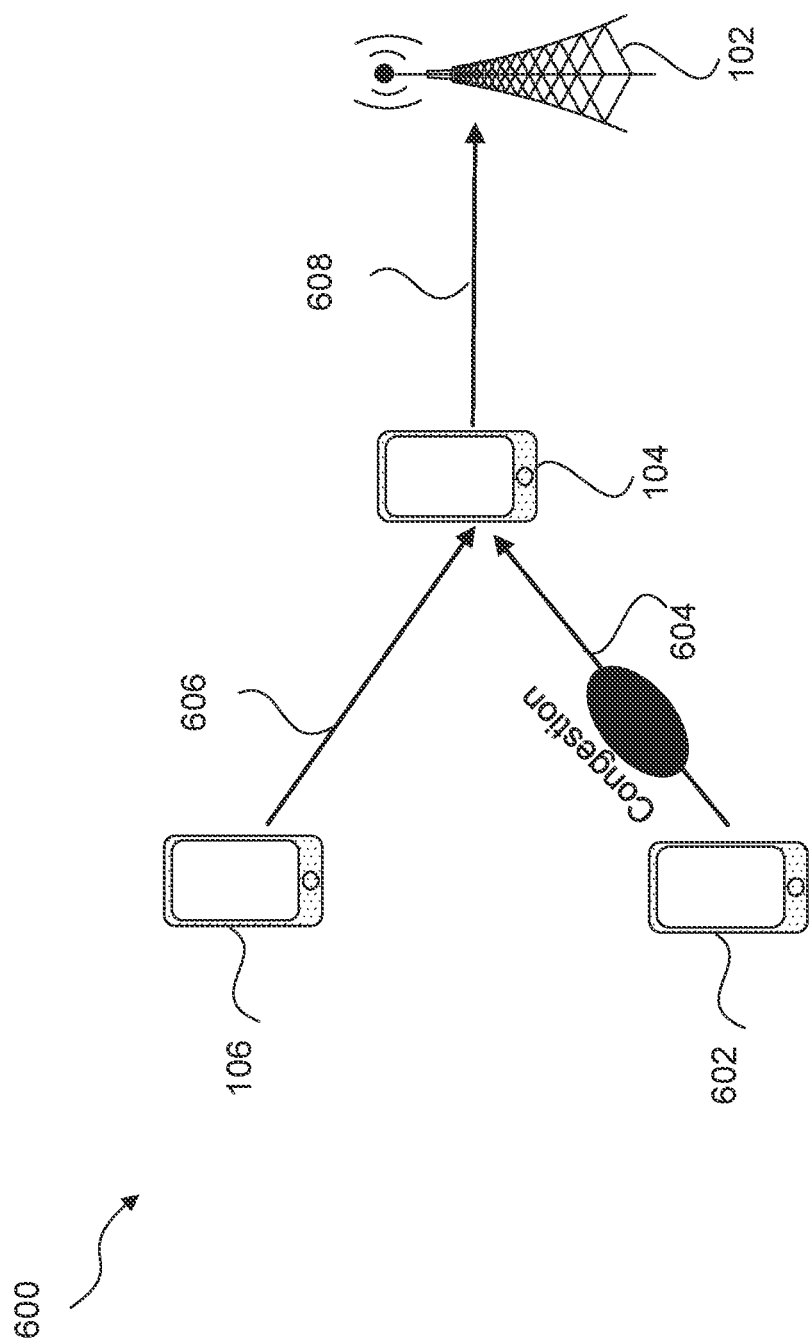
FIG. 6 illustrates an example system for logical channel prioritization according to aspects of the disclosure.

FIG. 6 illustrates an example system for logical channel prioritization. Example system 600 is provided for the purpose of illustration only and does not limit the disclosed aspects. System 600 may include, but is not limited to, the UE 106, the UE 104, a UE 602, and the base station 102. Similar to the discussion above, the UE 106 connects with the base station 102 via a hop 606 and a hop 608. The UE 602 also connects with the base station 102 via a hop 604 and the hop 608.

According to some aspects, the UE 104 multiplexes packets received from the UE 106 and the UE 602 and forwards them to the base station 102. The UE can multiplex the packets based on channel priorities. For example, the UE 106 transmits to the UE 104 via a first channel and the UE 602 transmits to the UE 104 via a second channel. The first channel has a higher priority than the second channel. The UE 104 prioritizes packets received via the first channel over packets received via the second channel. For example, the UE 104 multiplexes two packets received from the UE 106 for every packet received from the UE 602. In other words, the packets from the UE 106 are forwarded more frequently than the packets from the UE 602. In some aspects, the first channel and the second channel have a same priority. In such a case, the UE prioritizes packets based on QoS statuses. For example, the hop 606 is free of congestion, while the hop 604 is in congestion. As a result, the packets from the UE 602 likely have delays. For example, a first packet from the UE 602 arrives at the UE 104 with a 10 ms delay, while a second packet from the UE 106 arrives at the UE 104 on time. The UE 104 prioritizes the first packet because the first packet has a more urgent latency.

Figure 7:
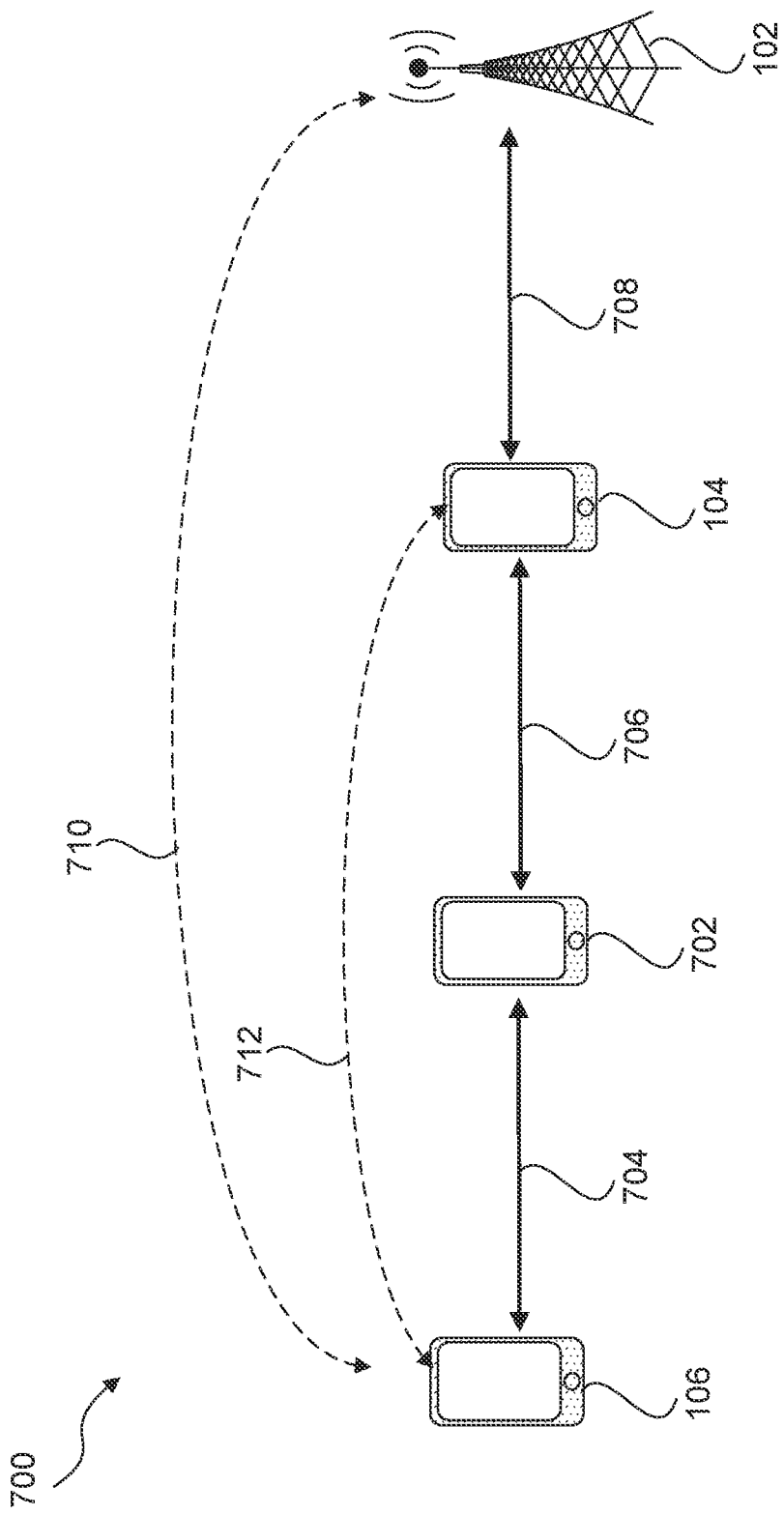
FIG. 7 illustrates an example of a side-link relay system comprising a plurality of hops, according to aspects of the disclosure.

FIG. 7 illustrates an example of a side-link relay system comprising a plurality of hops. Example system 700 is provided for the purpose of illustration only and does not limit the disclosed aspects. System 700 may include, but is not limited to, the UE 106, a UE 702, the UE 104, and the base station 102. The UE 106 connects with the base station 102 via a three-hop connection 710. The three-hop connection 710 includes a hop 704, a hop 706, and a hop 708.

According to some aspects, the three-hop connection has one or more $E_2E$ QoS requirements. For example, as discussed above, a packet transmitted from the UE 106 is expected to arrive at the base station 102 before a time point. The UE 104 can split the one or more $E_2E$ QoS requirements into three parts for the hop 704, the hop 706, and the hop 708 based on link conditions of the hops. For example, the UE 104 splits the one or more $E_2E$ QoS requirements based on a three-dimensional splitting table. The three-dimensional splitting table is a three-dimensional version of the splitting table described in the FIG. 3A, where the link conditions of three hops, instead of two hops, are included in the three-dimensional splitting table. In some aspects, the UE 104 can split the one or more $E_2E$ QoS requirements into N parts for an N-hop connection based on an N-dimensional splitting table, wherein N is a positive integer.

In some aspects, the UE 104 considers the hop 704 and the hop 706 as a single hop 712. In such a case, the UE 104 splits the one or more $E_2E$ QoS requirements into two parts for the hop 712 and the hop 708 as discussed above in FIG. 3A. For example, the hop 712 can be treated as the hop 304 and the hop 708 can be treated as the hop 306. The UE 702 further splits QoS requirements of the hop 712 into two parts for the hop 704 and the hop 706 as discussed above in FIG. 3B. For example, the hop 704 can be treated as the hop 310 and the hop 706 can be treated as the hop 312. In such a case, the UE 104 and the UE 702 split the one or more $E_2E$ QoS requirements for hops 704, 706, 708 in two steps. In addition, the two-step splitting can be extended to split the N-hop connection. In other words, the two-hop connection of FIG. 3A and the two-hop connection of FIG. 3B can be used as basic elements of the N-hop connection.

Figure 8:
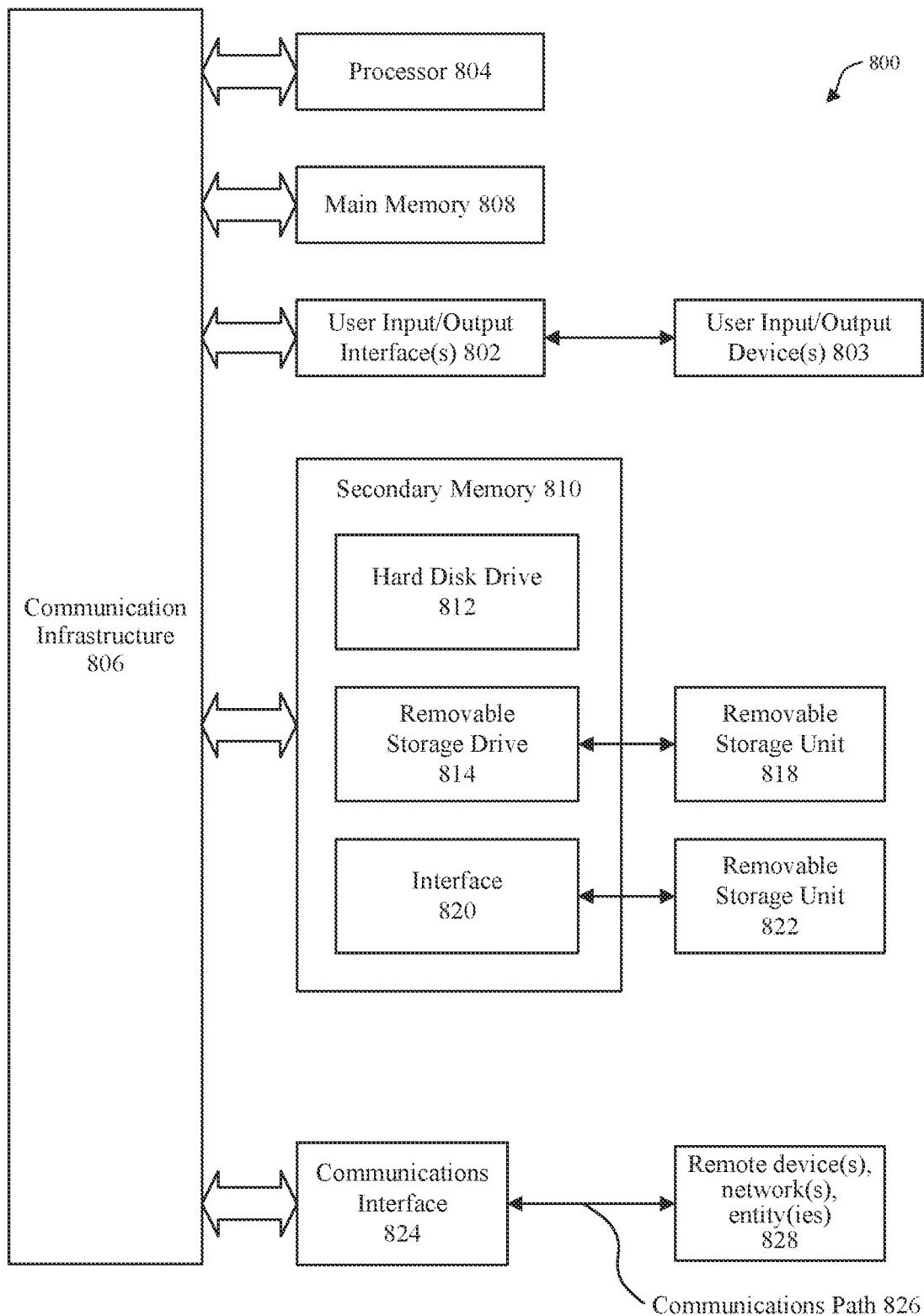
FIG. 8 is an example computer system for implementing some aspects of the disclosure or portion(s) thereof.

Various aspects may be implemented, for example, using one or more computer systems, such as computer system 800 shown in FIG. 8. Computer system 800 may be any well-known computer capable of performing the functions described herein such as electronic devices 104, 106, 108, and 102 of FIG. 1, or 200 of FIG. 2. Computer system 800 includes one or more processors (also called central processing units, or CPUs), such as a processor 804. Processor 804 is connected to a communication infrastructure 806 (e.g., a bus.) Computer system 800 also includes user input/output device(s) 803, such as monitors, keyboards, pointing devices, etc., that communicate with communication infrastructure 806 through user input/output interface(s) 802. Computer system 800 also includes a main or primary memory 808, such as random access memory (RAM). Main memory 808 may include one or more levels of cache. Main memory 808 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to some aspects, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 800, main memory 808, secondary memory 810 and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 8. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE) comprising:
a transceiver configured to enable wireless communication with a second UE and a wireless device; and
a processor, communicatively coupled to the transceiver, and configured to:
receive, from the second UE, an end-to-end (E2E) quality of service (QOS) requirement of an E2E connection between the second UE and the wireless device, wherein the E2E connection includes a first hop between the UE and the second UE and a second hop between the UE and the wireless device;
obtain a first hop link condition and a second hop link condition;
split the E2E QOS requirement into a first hop QoS requirement and a second hop QOS requirement based on the first hop link condition and the second hop link condition; and
transmit, using the transceiver, the first hop QoS requirement to the second UE,
wherein the wireless device is a third UE or a base station.

2. The UE of claim 1, wherein the processor is further configured to split the E2E QOS requirement by:
transmitting the first hop link condition and the second hop link condition to the base station;
transmitting the E2E QOS requirement to the base station; and
receiving the first hop QoS requirement and the second hop QOS requirement from the base station.

3. The UE of claim 1, wherein the processor is further configured to:
receive a QoS enforcement configuration from the base station,
wherein the QoS enforcement configuration includes an indication of enabling or disabling splitting the E2E QOS requirement, and
wherein the QoS enforcement configuration further includes a splitting table.

4. The UE of claim 3, wherein the processor is further configured to split the E2E QOS requirement by accessing the splitting table based on the first hop link condition and the second hop link condition.

5. The UE of claim 1, wherein the processor is further configured to:
receive a packet from the second UE;
determine a first hop QoS status based on the packet;
adjust the second hop QoS requirement based on the first hop QoS status;
allocate communication resources to the second hop based on the adjusted second hop QoS requirement; and
forward the packet to the wireless device based on the adjusted second hop QoS requirement using the communication resources.

6. The UE of claim 5, wherein the processor is further configured to adjust the second hop QoS requirement by:
determining a remaining QoS requirement based on a difference between the first hop QoS status and the E2E QOS requirement; and
adjusting the second hop QoS requirement based on the remaining QoS requirement.

7. The UE of claim 5, wherein the processor is further configured to allocate the communication resources by:
determining the communication resources based on the adjusted second hop QoS requirement;
sending a resource request indicating the communication resources to the base station;
receiving a resource allocation confirmation from the base station; and
allocating the communication resources to the second hop based on the resource allocation confirmation.

8. The UE of claim 5, wherein the processor is further configured to allocate the communication resources by:
determining the communication resources based on the adjusted second hop QoS requirement; and
allocating the communication resources to the second hop.

9. A method of operating a user equipment (UE) as a relay between a base station and a second UE, the method comprising:
obtaining a link condition of a second hop between the UE and the second UE of an end-to-end (E2E) connection, wherein the first hop of the E2E connection is between the base station and the UE;
transmitting the link condition of the second hop to the base station; and
receiving, from the base station, a second hop quality of service (QOS) requirement.

10. The method of claim 9, further comprising:
receiving, from the base station, an E2E QOS requirement of the E2E connection between the base station and the second UE.

11. The method of claim 10, further comprising:
receiving a packet from the base station;
determining a first hop QoS status based on the packet;
adjusting the second hop QoS requirement based on the first hop QoS status and the E2E QOS requirement;
allocating communication resources to the second hop based on the adjusted second hop QoS requirement; and forwarding the packet to the second UE based on the adjusted second hop QoS requirement using the communication resources.

12. The method of claim 11, wherein the adjusting the second hop QOS requirement further comprises:
   determining a remaining QoS requirement based on a difference between the first hop QoS status and the E2E QOS requirement; and
   adjusting the second hop QoS requirement based on the remaining QoS requirement.

13. The method of claim 12, wherein the allocating the communication resources further comprises:
   determining the communication resources based on the adjusted second hop QoS requirement;
   sending a resource request indicating the communication resources to the base station;
   receiving a resource allocation confirmation from the base station; and
   allocating the communication resources to the second hop based on the resource allocation confirmation.

14. The method of claim 12, wherein the allocating the communication resources further comprises:
   determining the communication resources based on the adjusted second hop QoS requirement; and
   allocating the communication resources to the second hop.

15. The method of claim 9,
   wherein the second hop is a side-link connection, and
   wherein the link condition includes a channel busy ratio (CBR) or a side-link reference signal received power (SL-RSRP).

16. A base station configured to serve a user equipment (UE) that is configured to provide a relay between a second UE and a wireless device, wherein an end-to-end (E2E) connection between the second UE and the wireless device includes a first hop between the second UE and the UE and a second hop between the UE and the wireless device, the base station comprising:
   a transceiver configured to enable wireless communication with the UE; and
   a processor, communicatively coupled to the transceiver, and configured to:
      generate a quality of service (QOS) enforcement configuration; and
      transmit the QoS enforcement configuration to the UE,
      wherein the QoS enforcement configuration includes an indication of enabling or disabling the UE to split an E2E QoS requirement associated with the E2E connection.

17. The base station of claim 16, wherein the QoS enforcement configuration includes a splitting table.

18. The base station of claim 16, wherein the QoS enforcement configuration further includes a first hop QoS requirement and a second hop QOS requirement.

19. The base station of claim 16, wherein the wireless device is the base station, and the processor is further configured to:
   receive the E2E QOS requirement from the UE;
   receive a first hop link condition from the UE;
   determine a second hop link condition;
   split the E2E QOS requirement into a first hop QoS requirement and a second hop QoS requirement based on the first hop link condition and the second hop link condition; and
   transmit the first hop QoS requirement and the second hop QoS requirement to the UE.

* * * * *